US009860261B2

(12) United States Patent
Halfon et al.

(10) Patent No.: US 9,860,261 B2
(45) Date of Patent: Jan. 2, 2018

(54) SYSTEM FOR ANALYZING AND MAINTAINING DATA SECURITY IN BACKUP DATA AND METHOD THEREOF

(71) Applicants: Guy Halfon, Rechovot (IL); Boaz Apt, Yahud (IL)

(72) Inventors: Guy Halfon, Rechovot (IL); Boaz Apt, Yahud (IL)

(*) Notice: Subject to any disclaimer, the term of this patent is extended or adjusted under 35 U.S.C. 154(b) by 0 days.

(21) Appl. No.: 14/880,380

(22) Filed: Oct. 12, 2015

(65) Prior Publication Data
US 2017/0104776 A1 Apr. 13, 2017

(51) Int. Cl.
*G06F 21/56* (2013.01)
*H04L 29/06* (2006.01)
*G06N 99/00* (2010.01)
*G06F 11/14* (2006.01)
*G06F 21/50* (2013.01)

(52) U.S. Cl.
CPC ...... *H04L 63/1425* (2013.01); *G06F 11/1446* (2013.01); *G06F 21/50* (2013.01); *G06F 21/56* (2013.01); *G06N 99/005* (2013.01)

(58) Field of Classification Search
CPC . G06F 21/56–21/568; G06F 11/1446–11/1469
See application file for complete search history.

(56) References Cited

U.S. PATENT DOCUMENTS

| | | | | |
|---|---|---|---|---|
| 7,664,797 B1 * | 2/2010 | Weisgerber | ......... | G06F 11/1464 707/649 |
| 2003/0212920 A1 * | 11/2003 | Fujibayashi | ........ | G06F 11/1456 714/6.32 |
| 2008/0195676 A1 * | 8/2008 | Lyon | ...................... | G06F 21/568 |
| 2012/0233123 A1 * | 9/2012 | Shisheng | .............. | G06F 11/004 707/639 |
| 2014/0250527 A1 * | 9/2014 | Tang | ...................... | G06F 21/561 726/23 |
| 2015/0113662 A1 * | 4/2015 | Muller | ................... | G05B 19/05 726/26 |
| 2015/0135317 A1 * | 5/2015 | Tock | ...................... | G06F 21/56 726/23 |

OTHER PUBLICATIONS

Gagneja, "Knowing the Ransomware and Building Defense Against it—Specific to HealthCare Institutes", 2017, 5 pages.*

* cited by examiner

*Primary Examiner* — Thaddeus Plecha
(74) *Attorney, Agent, or Firm* — Mark David Torche; Patwrite Law

(57) ABSTRACT

A computer-implemented method and system for analyzing and maintaining data security in backup data, comprising of: accessing backup data of file systems on-site or remotely from a backup server; determining which data is present in a backup system; defining an abnormality data selection criteria to identify security components within the scope of said backup system; performing a data security analysis on backup data; if data abnormality in data are detected in backup data, determining compromised target files, identifying all other files created or modified associated with said compromised target files, including files having a parent-child relationship in both up and down directions of the parent-child tree, including files that are other children of the compromised files in the parent-child tree, including files created or modified by of the compromised files, and including data launched from those files.

16 Claims, 3 Drawing Sheets

Figure 1:
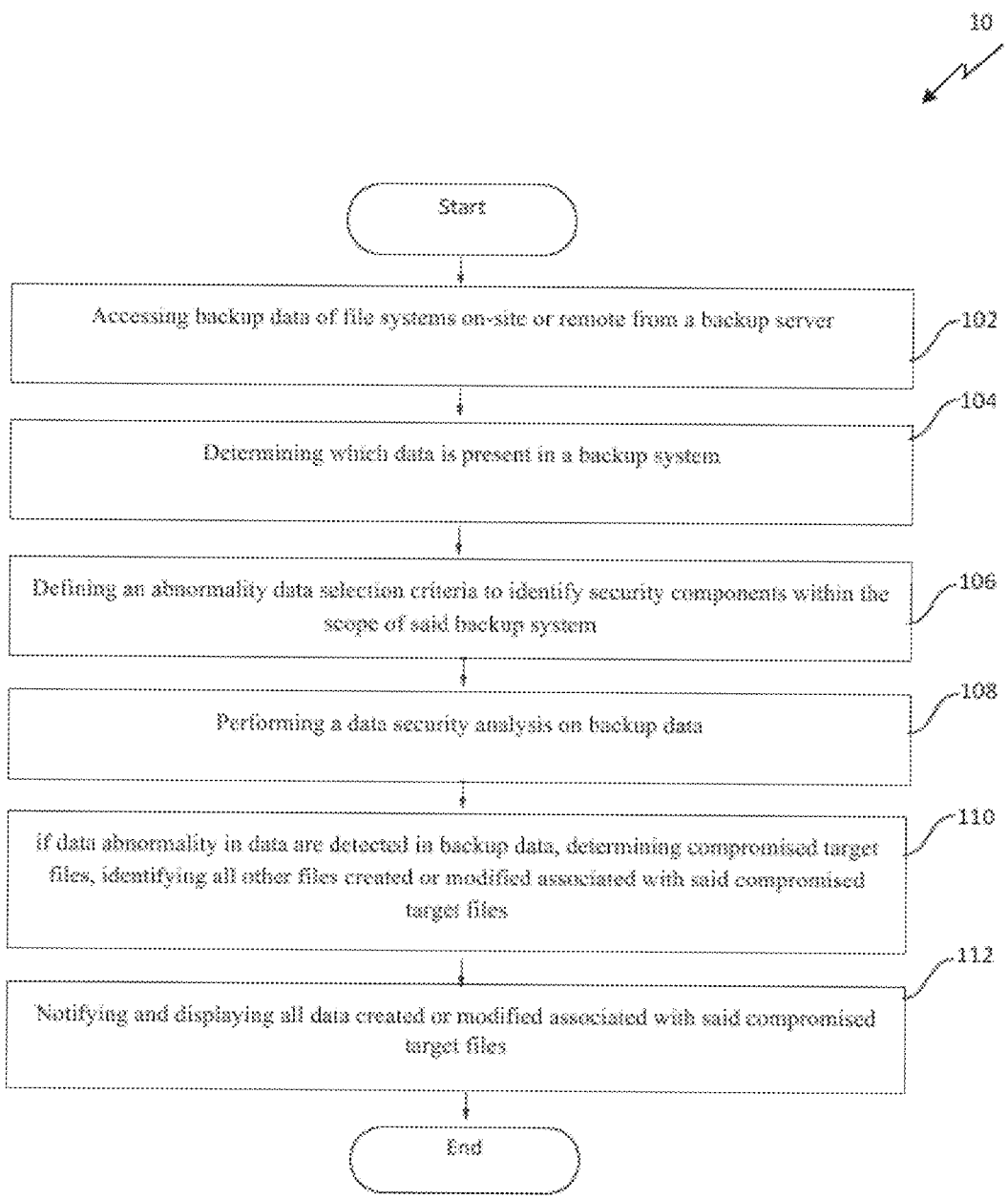

SYSTEM FOR ANALYZING AND MAINTAINING DATA SECURITY IN BACKUP DATA AND METHOD THEREOF

FIELD OF THE INVENTION

The present invention relates generally to data analysis of its security components and software, and more particularly to systems and methods for analyzing and maintaining data security in backup data.

BACKGROUND OF THE INVENTION

The present invention relates to a system and method for analyzing and maintaining backup files and/or objects against compromised security components, fraudulent activity, malicious software and other.

The following description includes information that may be useful in understanding the present invention. It is not an admission that any of the information provided herein is prior art or relevant to the presently claimed invention, or that any publication specifically or implicitly referenced is prior art.

It is very common to any kind and level of organizations to perform periodically a backup of their computer systems to prevent loss of data. Backup copies allow recovery of data in the event of a system crash, natural disaster, cyberattack, or operator error that causes data stored on the system to be destroyed or lost. Thus, while malicious components, compromised security elements, fraudulent activity can be still present on the operating systems, a backup procedure can be performed, containing and archiving such undetected malicious components.

In the context of data integrity and availability in a form of fraud prevention and detection in information systems, much internal organizational fraud/malicious activity is facilitated by the manipulation of digital data. Such data includes email, documents, spreadsheets, databases and, of course, accounting records. Changes of digital data over time, particularly deletions, are extremely difficult to discover or track. For example, a missing digital document or email may not be noticeable precisely because the object no longer exists. Something that does not exist, where a trail is not noticeable or nonexistent, is difficult or impossible to see.

U.S. Pat. No. 8,805,925 discloses method and apparatus for maintaining high data security and for providing a secure audit for fraud prevention and detection various where comparisons of computer folders from different points in time are performed. Such comparisons provide the ability to discover missing documents or documents with modification dates that have changed when there would otherwise have been no need to change them and thus allows discovery of missing documents to discover fraud or to search for evidence after a fraud is suspected. In another embodiment, deltas in accounting system vendor invoice accounts are compared at different points in time, potentially exposing the practice of moving fraudulent vendor transactions into a large group of legitimate transactions for a legitimate vendor. Per period transaction totals for specific periods for legitimate vendors are compared over historical time for suspicious activity. A comparison of reports from the two different periods, using exact data and software from those separate periods (instead of reporting from "current" data), may raise a red flag otherwise missed.

In the context of protecting data integrity and confidentiality from malware in computers and machines, a virus is a self-replicating/self-reproducing-automation program that spreads by inserting copies of itself into other executable code or documents. Though the term "virus" may be defined as a type of malware (malicious software), it is common to use "virus" to refer to any kind of malware, including worms, Trojan horses, spyware, adware, etc. Computer antivirus programs are commonly used to detect, clean, and remove computer viruses from compromised objects such as data files. One form of detection typically used is scanning of objects resident on a hosting computer system's storage device(s). Objects are scanned for the presence of an embedded virus, and the scanning may be either signature-based or heuristic (such as watching for suspicious behavior). However, signature-based virus scanning relies on signatures obtained from previously-identified viruses and does not detect viruses that have not yet been identified and analyzed ("day-zero" or "zero-day" attacks). These are attacks that have no known solution and/or detection signature. Existing heuristic methods are not foolproof and may fail to detect virus attacks. Thus, antivirus programs may not know that an object has been compromised. Of these multiple malware components, some are known to anti-malware databases and anti-malware software vendors, but frequently not all of the components are known. Thus, even upon a detection of infection by the malware in real-time, the antivirus software removes the malware on the computer, but only of those components which are known to it. Once the removal is complete, the anti-malware software is configured to report that the incident is over, and program operations proceed as before. However, malware components that were unknown to the anti-malware software can remain performing malicious activity without the user being aware of it.

Several methods where analyzing and detecting malware in computer systems are known.

U.S. Pat. No. 7,472,420 discloses a system, method, and computer program product for identifying malware components on a computer, including detecting an attempt to create or modify an executable file or an attempt to write to a system registry; logging the attempt as an auditable event; performing a malware check on executable files of the computer; if malware is detected on the computer, identifying all other files created or modified during the auditable event, and all other processes related to the auditable event; terminating the processes related to the auditable event; deleting or quarantining the executable files created or modified during the auditable event; and if the deleted executable files include any system files, restoring the system files from a trusted backup. Optionally, all files and processes having a parent-child relationship to a known malware component or known compromised file are identified. A log of auditable events is maintained, and is recoverable after system reboot.

U.S. Pat. No. 8,468,604 discloses a method for protecting objects in a computer system against malware. An object is analyzed to determine whether it is compromised by malware, and if it is determined to be compromised, a backup copy of the object is located in a backup of the objects. The compromised object is replaced with the backup copy.

U.S. Pat. No. 8,527,465 discloses a system and method for identifying file system events over time using at least two consecutive backup images for the file system. Using consecutive backup images for the file system enables the present invention to identify whether files have been created, removed or altered between backup operations, without actually interfering or interacting with the file system itself. As a result, the information gathered may be compiled to generate a more accurate file system model for the backed up file system. As a further result, the present invention is a less invasive way to gather information about file system events. The system however is directed to determine common file system events in order to generate a more accurate file system model, and does not disclose analyzing and maintaining data security in backup data files and/or objects against malicious activity and system security irregularities/anomalies.

None of the current technologies and prior art, taken alone or in combination, does not address analyzing and maintaining data security on all three levels of data security in backup data based on comparison of one or more backup systems initiated in one or more different periods of time. The known technologies in prior art address a real-time threat, fraud and malware detection techniques taught in the prior art occur at different layers in the operable computer system, not retroactively at the backup system and/or servers. Because the present invention operates at backup system, it has the ability to analyze general behaviors associated with compromised data matching security signatures retroactively, performing an additional step of problem detection, if such was missed in the operating system.

Therefore, there is a long felt and unmet need for a system and method that overcomes the problems associated with the prior art. The present invention provides a system and method for analyzing and maintaining data security in backup data files and/or objects against malicious activity and system security anomalies.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY OF THE INVENTION

It is thus an object of the present invention to provide a computer-implemented method for analyzing and maintaining data security in backup data, said method comprising the steps of: accessing backup data of file systems on-site or remotely from a backup server; determining which data is present in a backup system; defining an abnormality data selection criteria to identify security components within the scope of said backup system; performing a data security analysis on backup data; and if data abnormality is detected in backup data, determining compromised target files, identifying all other files created or modified associated with said compromised target files, including files having a parent-child relationship in both up and down directions of the parent-child tree, including files that are other children of the compromised files in the parent-child tree, including files created or modified by of the compromised files, and including data launched from those files.

It is another object of the present invention to provide a system for analyzing and maintaining data security in backup data, said system comprising: a processor; memory; an analysis module is configurable to access backup data of file systems on-site or remotely from a backup server, determine which data is present in a backup system, define an abnormality data selection criteria to identify security components within the scope of said backup system; perform a data security analysis on backup data; and if data abnormality is detected in backup data, determining compromised target files, identifying all other files created or modified associated with said compromised target files, including files having a parent-child relationship in both up and down directions of the parent-child tree, including files that are other children of the compromised files in the parent-child tree, including files created or modified by of the compromised files, and including data launched from those files.

BRIEF DESCRIPTION OF THE PREFERRED EMBODIMENTS

Figure 2:
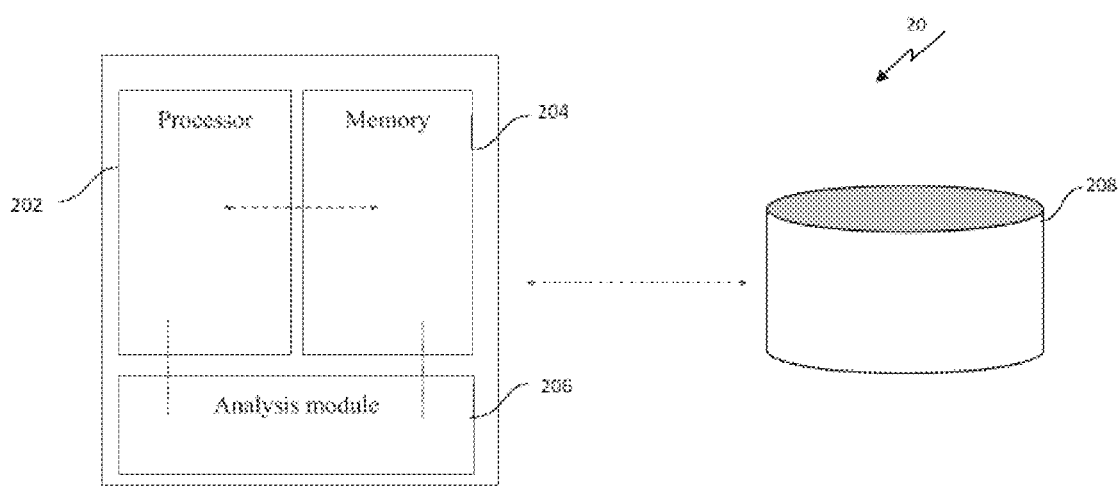
Figure 3:
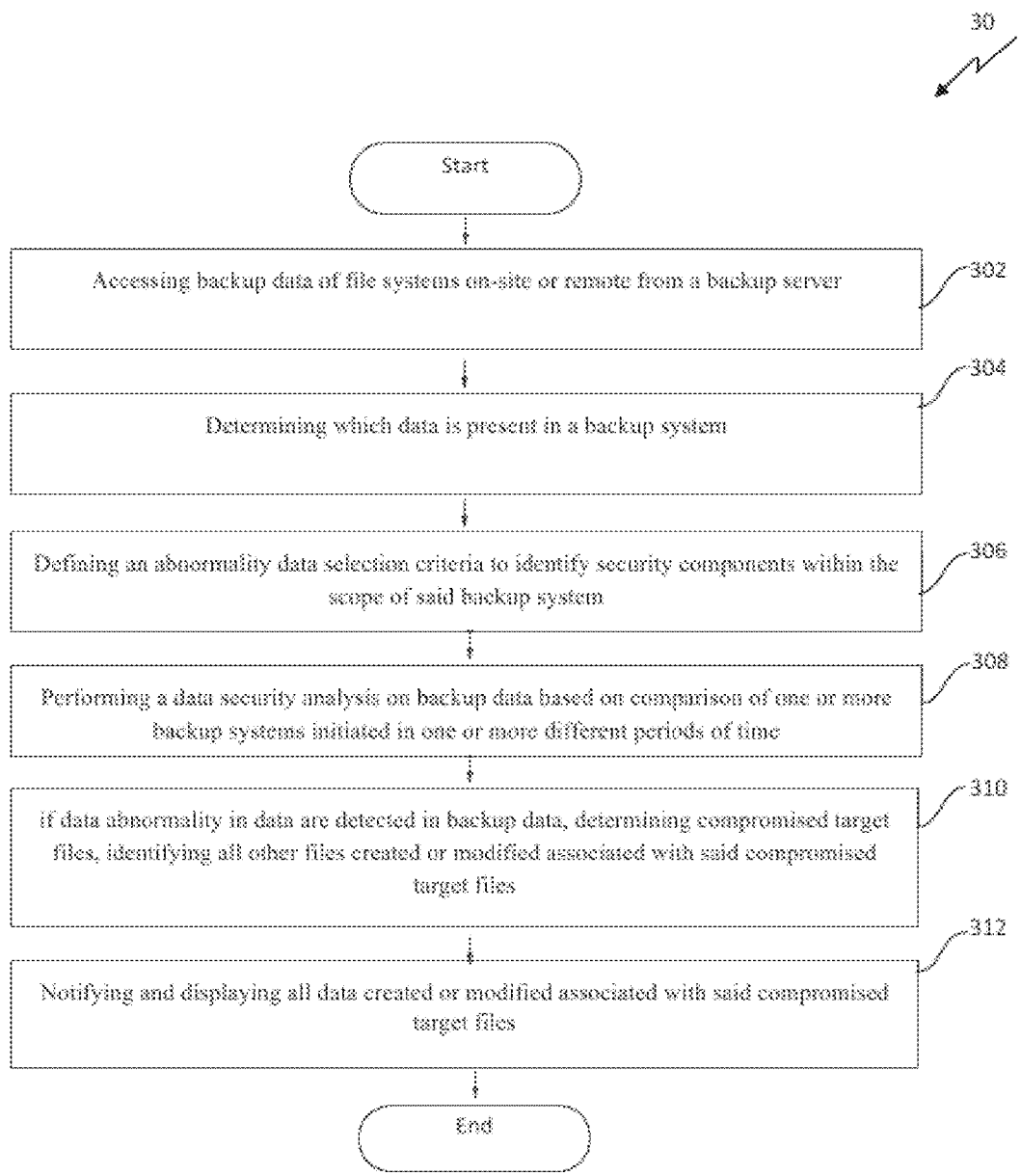

The novel features believed to be characteristics of the invention are set forth in the appended claims. The invention elf, however, as well as the preferred mode of use, further objects and advantages thereof, will best be understood by reference to the following detailed description of illustrative embodiment when read in conjunction with the accompanying drawings, wherein:

FIG. 1 presents a top level scheme of the method disclosed by the present invention;

FIG. 2 presents an embodiment of the system disclosed by the present invention;

FIG. 3 presents a top level scheme of the method based on comparison of one or more backup systems disclosed by the present invention.

DETAILED DESCRIPTION OF THE PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The present invention may be practiced according to the claims without some or all of these specific details. For the purpose of clarity, technical material that is known in the technical fields related to the invention has not been described in detail so that the present invention is not unnecessarily obscured.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "displaying", "detecting," "performing," "identifying," "configuring" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices, including integrated circuits down to and including chip level firmware, assembler, and hardware based micro code.

The term "storage/memory" refers hereinafter to any collection, set, assortment, cluster, selection and/or combination of content stored digitally.

The term "backup" refers hereinafter to a copy of one or more files created as an alternate in case the original data is lost or becomes unusable and can be accessed on-site and/or remotely (for example cloud-based).

The term "abnormal data" refers hereinafter to any security issue associated with comprised data security, unauthorized access, fraudulent activity, compromised client accounts data and/or other malicious and/or unwanted activity, such as computer viruses, worms, Trojan horses, spyware, unauthorized adware, or combinations thereof.

The term "data security" refers hereinafter to confidentiality, integrity and availability of an organization's information—assurance that information is shared only among authorized persons or organizations; assurance that the information is authentic and complete; and assurance that the systems responsible for delivering, storing and processing information are accessible when needed accordingly.

The term "comparison" refers herein after to any data manipulation of one or more data objects in order to detect abnormal data activity associated with the analyzed data objects.

While the invention is susceptible to various modifications and alternative forms, specific embodiments thereof have been shown by way of example in the drawings and the above detailed description. It should be understood, however, that it is not intended to limit the invention to the particular forms disclosed, but on the contrary, the intention is to cover all modifications, equivalents, and alternatives falling within the spirit and scope of the invention as defined by the appended claims.

Reference is now made to FIG. 1, presenting a flow diagram illustrating a general method for analyzing and maintaining data security in backup data 10. Said method comprises, for a number of repetitions, steps of providing a system for analyzing and maintaining data security in backup data 20, the method comprising steps of: accessing backup data of file systems on-site or remotely from a backup server 102; determining which data is present in a backup system 104; defining an abnormality data selection criteria to identify security components within the scope of said backup system 106; performing a data security analysis 108; if data abnormality in data are detected in backup data, determining compromised target files, identifying all other files created or modified associated with said compromised target files, including files having a parent-child relationship in both up and down directions of the parent-child tree, including files that are other children of the compromised files in the parent-child tree, including files created or modified by of the compromised files, and including data launched from those files 110.

Further to step 110, the method comprises notifying and displaying all data created or modified associated with said compromised target files 112.

Further to step 108, it comprises an additional data security and performance analysis by performing it based on comparison of one or more backup systems initiated in one or more different periods of time and interrogating suspicions backup data source in a form of performing a test run by launching the file using virtual machine environment and/or dedicated original data application environment.

Reference is made to FIG. 2, presenting a schematic and generalized presentation of the present invention environment including a system for analyzing and maintaining data security in backup data 20, said system comprising: a processor 202; memory 204; an analysis module 206 that is responsible for detecting the presence of abnormal data activity and malicious activity in the backup data. The analysis module 206 is configurable to access backup data of file systems on-site or remotely from a backup server 208, determine which data is present in a backup system 208, define an abnormality data selection criteria to identify security components within the scope of said backup system, perform a data security analysis on backup data based on comparison of one or more backup systems initiated in one or more different periods of time, identify files related to compromised target files, if data abnormality and/or difference in data are detected in backup data, determining compromised target files, identifying all other files created or modified associated with said compromised target files, including files having a parent-child relationship in both up and down directions of the parent-child tree, including files that are other children of the compromised files in the parent-child tree, including files created or modified by of the compromised files, and including data launched from those files.

The analysis module 206 uses a predetermined and/or pattern irregularities machine-learning screening rules comprise at least one of the following: rules for detecting a time of access of the compromised data in the backup system, rules for detecting malicious and/or fraudulent activity present in the backup system based on the known structure of original files, rules for detecting suspicious present modifications to backup system files and other critical files, and rules recognizing behavior of known malicious programs based on their disk access patterns, or any combination thereof.

The analysis module 206 is further configurable to interrogate said backup data source in a form of performing a test run by launching the file using virtual machine environment and/or dedicated original data application environment.

Reference is now made to FIG. 3, presenting a flowchart diagram of method 30 for analyzing and maintaining data security in backup data based on comparison of one or more backup systems. Method 30 comprises providing a system for analyzing and maintaining data security in backup data, such as system 20 shown in FIG. 2, the method comprising steps of: accessing backup data of file systems on-site or remotely from a backup server 302; determining which data is present in a backup system 304; defining an abnormality data selection criteria to identify security components within the scope of said backup system 306; performing a data security analysis on backup data based on comparison of one or more backup systems initiated in one or more different periods of time 308. If data abnormality in data is detected in backup data at step 308, method 30 further comprises determining compromised target files, identifying all other files created or modified associated with said compromised target files, including files having a parent-child relationship in both up and down directions of the parent-child tree, including files that are other children of the compromised files in the parent-child tree, including files created or modified by of the compromised files, and including data launched from those files, at step 310. Finally, method 30 concludes with notifying and/or displaying any abnormality in data detected in backup data at step 312 as well as any files created or modified associated with the compromised target files including files having a parent-child relationship in both up and down directions of the parent-child tree, including files that are other children of the compromised files in the parent-child tree, including files created or modified by of the compromised files, and including data launched from those files, which might have been discovered at step 310.

The invention claimed is:

1. A computer-implemented method for detecting a security breach in a computer system by analyzing backup data of said computer system, said method comprises the steps of:
   a. accessing backup data of said computer, wherein said backup data comprising any collection of backups of said computer system, taken in at least two different times;
   b. determining which backups of said computer system are present in said backup data;
   c. selecting at least one data set of a first backup and selecting at least one data set of a second backup, wherein said first backup has been taken at a different time than said second backup;
   d. defining at least one abnormality selection criterion to identify a security breach of said computer system;
   e. performing a comparative analysis for any differences between said at least one data set of said first backup and said at least one data set of said second backup;
   f. detecting a difference between said at least one data set of said first backup and said at least one data set of said second backup which corresponds to said at least one abnormality selection criterion;
   g. determining compromised target files, associated with said difference between said at least one data set of said first backup and said at least one data set of said second backup detected at said step of detecting;
   h. identifying any files associated with said compromised target files selected from the group consisting of: files having a parent-child relationship in both up and down directions of a parent-child tree, files that are children of said compromised files in a parent-child tree, files created or modified by said compromised files and data files launched from said compromised files.

2. The method of claim 1, wherein said step of defining at least one abnormality selection criterion comprises defining a criterion selected from the group consisting of: deletion of a file, deletion of a record, deletion of a document, deletion of an e-mail and deletion of a financial record.

3. The method of claim 1, wherein said data comparative analysis comprises applying predetermined and/or pattern irregularities based on machine-learning screening rules to said backup data.

4. The method of claim 3, wherein said machine-learning screening rules comprise at least one set of rules selected from the group consisting of: rules for detecting a time of access of the compromised target files, rules for detecting malicious activity, rules for detecting fraudulent activity based on a structure of original files, rules for detecting suspicious present modifications to backup system files and rules recognizing behavior of known malicious programs based on disk access patterns.

5. The method of claim 1, wherein said method further comprises a step of notifying and displaying all data associated with said compromised target files.

6. The method of claim 5, wherein said step of notifying and displaying further comprises at least one member selected from the group consisting of: providing a notification to a host backup operating system, providing a notification to a remote system, providing a notification to a user, producing a log file, and sending a message over a network.

7. The method of claim 1, wherein said step of performing a comparative analysis further comprises at least one step selected from the group consisting of: a step of interrogating a backup data source in a form of performing a test run by using a virtual machine and a step of interrogating said backup data source in a form of dedicated data applications.

8. The method of claim 1, wherein said at least one abnormality selection criterion is based on maintaining data security against at least one event selected from the group consisting of: an unauthorized access, fraudulent activity, compromised accounts data, malicious activity, unwanted activity, computer viruses, worms, Trojan horses, spyware, and unauthorized adware.

9. A system for detecting a security breach in a computer system by analyzing backup data of said computer system, said system comprising:
   a. a processor;
   b. memory;
   c. an analysis module, wherein said module is configurable to:
      i. access backup data of said computer system;
      ii. determine which backups are present in said backup data, wherein said backup data comprising any collection of backups of said computer system, taken in at least two different times;
      iii. select at least one data set of a first backup and selecting at least one data set of a second backup, wherein said first backup has been taken at a different time than said second backup;
      iv. define at least one abnormality selection criterion to identify a security breach in said computer system;
      v. perform a comparative analysis for any differences between said at least one data set of said first backup and said at least one data set of said second backup;

vi. detect a difference between said at least one data set of said first backup and said at least one data set of said second backup which corresponds to said at least one abnormality selection criterion;
vii. determine compromised target files, associated with said difference between said at least one data set of said first backup and said at least one data set of said second backup detected at said step of detecting;
viii. identify any files associated with said compromised target files, selected from the group consisting of: files having a parent-child relationship in both up and down directions of a parent-child tree, files that are children of said compromised files in a parent-child tree, files created or modified by said compromised files, and data files launched from said compromised files.

10. The system of claim 9, wherein said at least one abnormality selection criterion comprises a criterion selected from the group consisting of: deletion of a file, deletion of a record, deletion of a document, deletion of an e-mail and deletion of a financial record.

11. The system of claim 9, wherein said analysis module is further configurable to apply predetermined and/or pattern irregularities based on machine-learning screening rules to said backup data.

12. The system of claim 11, wherein said machine-learning screening rules comprise at least one set of rules selected from the group consisting of: rules for detecting a time of access to said compromised target files, rules for detecting malicious activity, rules for detecting fraudulent activity based on a structure of original files, rules for detecting suspicious present modifications to backup system files, rules for detecting suspicious present modifications to critical files, and rules recognizing behavior of known malicious programs based on their disk access patterns.

13. The system of claim 9, wherein said analysis module is further configurable to notify and display all data associated with said compromised target files.

14. The system of claim 13, wherein said analysis module is further configurable to at least one member selected from the group consisting of: provide a notification to a host backup operating system, provide a notification to a host backup operating system remote system, provide a notification to a host backup operating system user, producing a log file, and sending a message over a network.

15. The system of claim 9, wherein said at least one abnormality selection criterion is based on maintaining data security against at least one event selected from the group consisting of: an unauthorized access, fraudulent activity, compromised accounts data, malicious activity, unwanted activity, computer viruses, worms, Trojan horses, spyware, and unauthorized adware.

16. The system of claim 9, wherein said analysis module is further configurable to at least one member selected from the group consisting of: to interrogate a backup data source in a form of performing a test run by using a virtual machine and to interrogate said backup data source in a form of dedicated data applications.

* * * * *